UNITED STATES PATENT OFFICE.

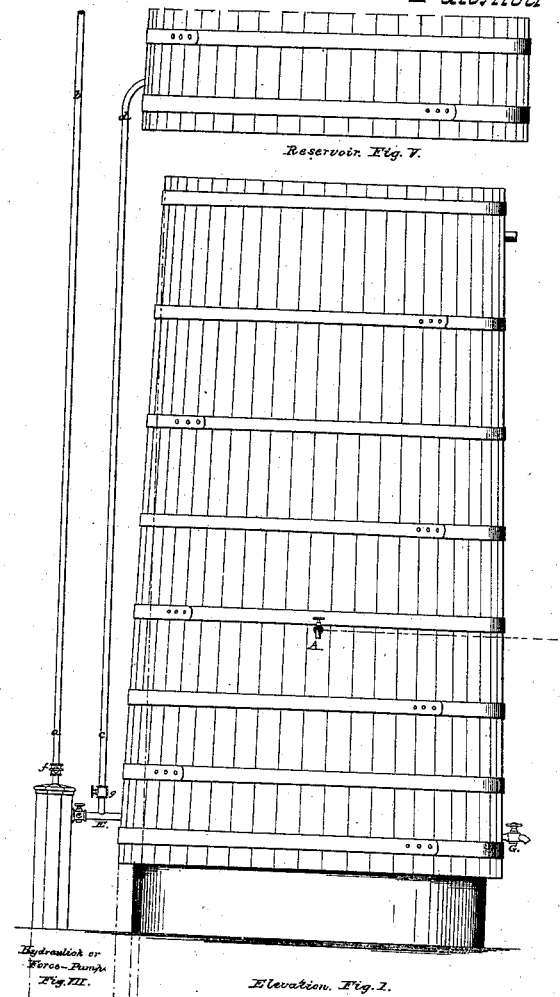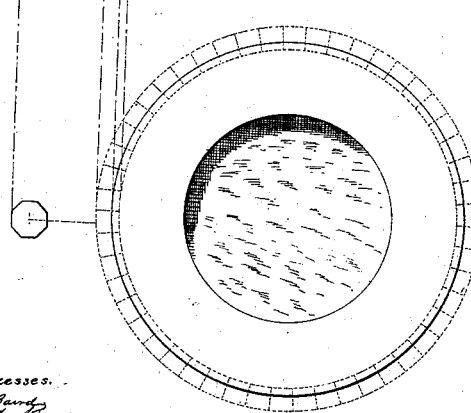

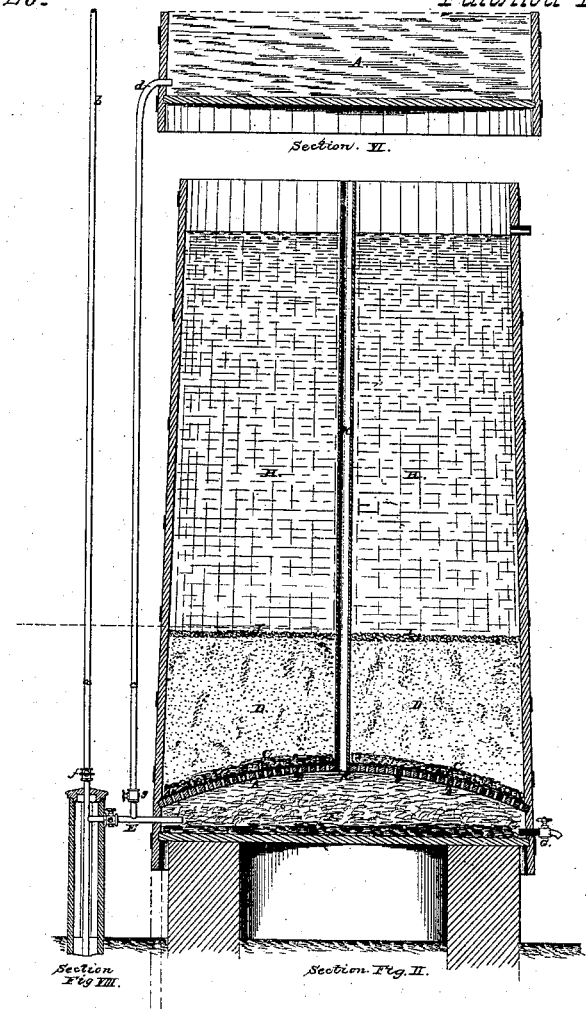
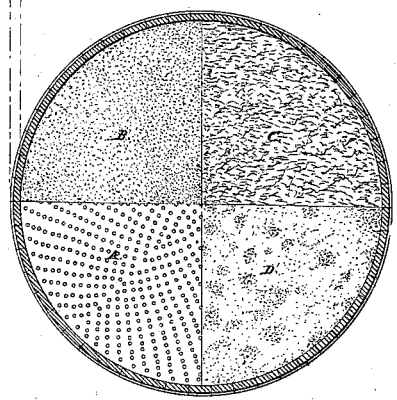

NATHAN F. RICE, OF NEW ORLEANS, LOUISIANA.

FILTERING APPARATUS.

Specification of Letters Patent No. 22,826, dated February 1, 1859.

*To all whom it may concern:*

Be it known that I, NATHAN F. RICE, of New Orleans, in the State of Louisiana, have invented a new and Improved Mode of Filtering Water or other Impure Liquids; and I do hereby declare the following to be a correct description of the same, reference being had to the accompanying drawings, in which—

Figure 1 is a side elevation of my improved filter; Fig. 2 is a vertical central section of the same; Fig. 3, is a plan of the foundation of the filter. Fig. 4 is a plan showing cross sections of the various filtering media; Fig. 5 is a side elevation of an upper reservoir; Fig. 6 is a central vertical section of the same. Fig. 7 is a side elevation of the hydrant or force pump, and Fig. 8 is a vertical section of the same.

The nature of my invention consists in receiving the water to be filtered at the bottom of the cistern or other receptacle and filtering it upward through a filtering medium composed as hereinafter more particularly described, which makes the filter much less liable to become foul, and enables it to be cleansed by the action of its contained water, coöperating with the gravitation of the particles of impure matter which may be mingled with the materials forming the filtering medium.

To enable others skilled in the art to make and use my improved cistern, I will proceed to describe its construction and operation.

In the lower portion of a common cistern, such as is shown by Fig. 1, I place a convex or dome-like false bottom, perforated with holes, as shown at A in Fig. 2. The lower edges of this perforated bottom, are about six inches from the real bottom of the cistern. From the center of this false bottom, rises an air tube (K), which reaches to the top of the cistern, as shown. I cover the top of this false bottom with a single thickness of flannel (marked B in Fig. 2), and, on the flannel, I place a layer of Spanish moss, 10 inches in thickness, (see B Fig. 2.) The moss, I cover with a layer, three or four feet in thickness, of fine clean, sharp sand, marked D in Fig. 2. For ordinary purposes, this filtering medium will be sufficient; but should there be a great head of water, I would cover the sand with a second layer of moss, (marked E, Fig. 2), and place over all a cover of boards, so weighted, or fastened, as to prevent the buoyancy of the water from loosening the sand in the filter.

When this filter is in operation, the water is let into the lower chamber, F, through pipe, E, leading from a hydrant or reservoir. The air that may be in chamber F escapes through air tube (K), and the water rises through the filtering medium, to the upper portion of the cistern, where it is found perfectly free from impurities, and whence it is drawn off for use through cock A, Fig. 1.

Letter G, in Fig. 2, marks a waste-water cock, or blow off cock, which is closed when the filter is in operation. When, however, it is desired to cleanse the filter, cock G is opened, when the head of pure water in the upper part, H, of the cistern, forces its way down, through the various filtering media, and carries off all sediment and impurities, through cock G, leaving the filtering medium as clean as when first put in operation. The cock, G, is then closed, and the filter is ready for renewed operation.

When a hydrant is not at hand, I use an artificial reservoir, as represented by Figs. 5 and 6, and force the water up, by a pump, through the pipes $a$, $b$, Figs. 7 and 8, into such reservoir. From the reservoir, the water passes down, through pipes $c$, $d$, into pipe E, Fig. 2, and enters the lower chamber, F, through that pipe as before.

Moss, though an excellent filtering medium on some accounts, especially on account of its not being injuriously affected by constant immersion, is liable to the objection of discoloring the water for a considerable length of time. It may, therefore be omitted where this discoloration is objected to.

Having thus described my invention, what I claim, and desire to secure by Letters Patent, is:—

In cisterns filtering from below upward, the chamber F, dome-like diaphragm A, and air-tube K, constructed and arranged for conjoint operation, substantially in the manner described.

The above specification signed and witnessed this 25th day of November 1858.

NATHAN F. RICE.

Witnesses:
I. HAMILTON RICHEY,
H. N. CRUMHORN.